US005905318A

United States Patent [19]
Faulhaber et al.

[11] Patent Number: 5,905,318
[45] Date of Patent: May 18, 1999

[54] ELECTRIC MOTOR

[75] Inventors: Michael Faulhaber, Mannheim; Walter Ripplinger, Rheinhause, both of Germany

[73] Assignee: Frankl & Kirchner GmbH & Co. KG Fabrik für Elektromotoren u. elektrische Apparate, Schwetzingen, Germany

[21] Appl. No.: 08/897,676

[22] Filed: Jul. 21, 1997

[51] Int. Cl.[6] ........................................................ H02K 9/00
[52] U.S. Cl. .............................. 310/58; 310/59; 310/62; 310/63; 310/89; 310/53
[58] Field of Search .............................. 310/58, 59, 53, 310/62, 63, 60 A, 60 R, 89

[56] References Cited

U.S. PATENT DOCUMENTS

| 4,465,948 | 8/1984 | Oyama et al. | 310/62 |
|---|---|---|---|
| 5,196,747 | 3/1993 | Kress et al. | 310/89 |
| 5,714,810 | 2/1998 | Yuhi et al. | 310/40 |

FOREIGN PATENT DOCUMENTS

| 0433247 | 6/1991 | European Pat. Off. . |
|---|---|---|
| 0 610 757 | 8/1994 | European Pat. Off. . |
| 19 15 638 | 11/1969 | Germany . |
| 26 59 650 | 11/1978 | Germany . |
| 30 42 721 | 9/1981 | Germany . |
| 31 22 655 | 1/1983 | Germany . |
| 89 00 917 | 4/1989 | Germany . |
| 37 35 734 | 5/1989 | Germany . |
| 9607882 | 2/1997 | Germany . |
| 9700643 | 4/1997 | Germany . |

*Primary Examiner*—Nestor Ramirez
*Assistant Examiner*—Thanh Lam
*Attorney, Agent, or Firm*—Browdy and Neimark

[57] ABSTRACT

An electric motor comprises a flange at one end, the corner portions of the flange projecting over the outline of the stator. A ventilator is provided at the opposite end, having outlets which are in alignment with the corner portions. The ventilator does not project over the borderline of the flange.

8 Claims, 2 Drawing Sheets

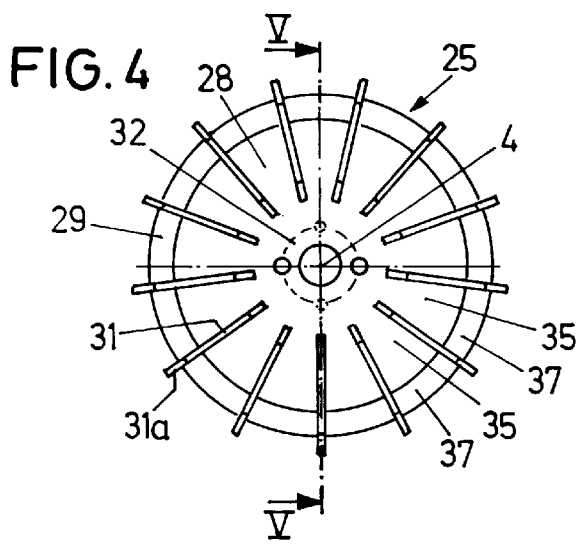
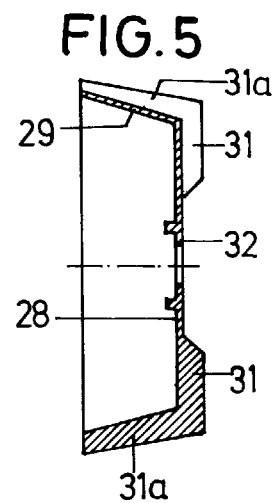
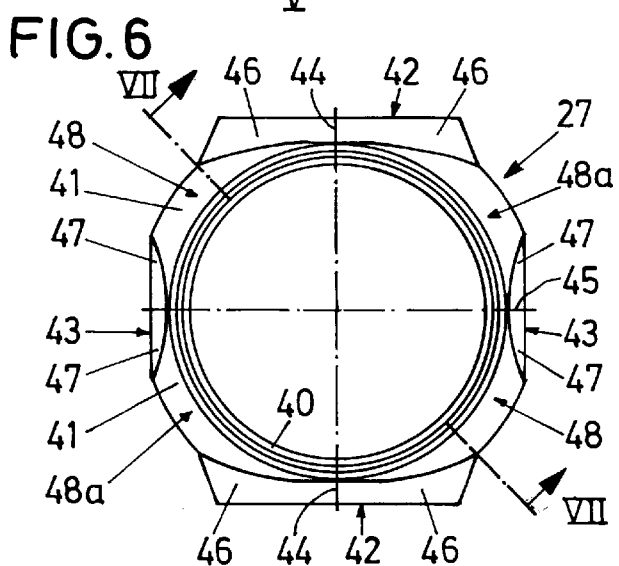
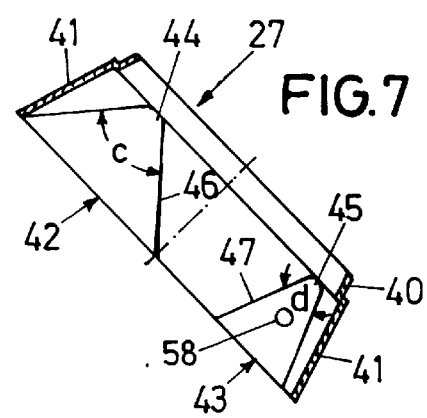
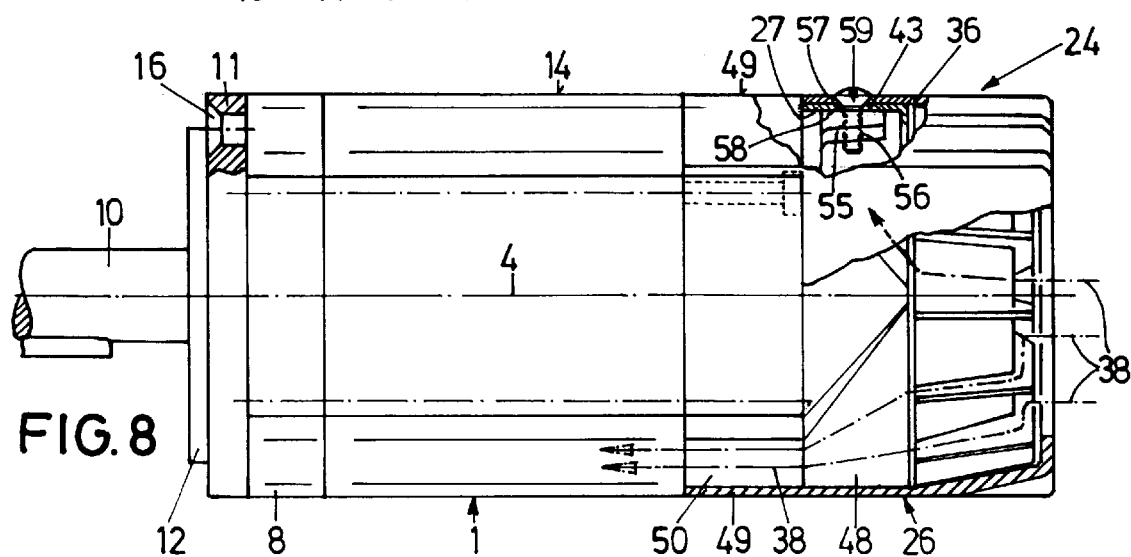

ELECTRIC MOTOR

BACKGROUND OF THE INVENTION

1. Field of the Invention

The invention relates to an electric motor which comprises a stator having a central longitudinal axis and an outline; a shaft disposed concentrically of the axis in the stator; an end shield on the drive side and an end shield on the ventilator side, in both of which the shaft is run; a flange, which is provided on the end shield on the drive side and which has corner portions projecting over the outline of the stator; and a ventilator, which is adjacent to the end shield on the ventilator side, and which comprises a ventilator wheel coupled for rotation with the shaft and a ventilator cowl covering the ventilator outwardly.

2. Background Art

As a rule, motors of the generic type have a flange of which only the corners project from the stator. It is considered unsatisfactory that a ventilator disposed at the other end projects from the cross-sectional area given by the flange, this leading to problems of mounting, in particular on sewing machines, where these motors are used as position drives.

SUMMARY OF THE INVENTION

It is the object of the invention to embody an electric motor of the generic type in such a way that the ventilator does not project over the cross-sectional shape of the flange.

According to the invention, this object is attained by the ventilator comprising air outlets directed toward the stator and in alignment with the corner portions of the flange. The ventilator can have a cross-section maximally corresponding to that of the flange. The outlets of the ventilator are in alignment with those portions of the flange which project over the outline of the stator. The air flowing off the ventilator moves along the outline of the stator.

Further features, advantages and details of the invention will become apparent from the ensuing description of an exemplary embodiment, taken in conjunction with the drawing.

BRIEF DESCRIPTION OF THE DRAWING

FIG. 4 is a plan view of a ventilator wheel, FIG. 5 is a cross-section through the ventilator wheel on the line V—V of FIG. 4, FIG. 6 is a front view of an air conduction screen, FIG. 7 is a section through the air conduction screen on the line VII—VII of FIG. 6, and FIG. 8 is a plan view of the electric motor corresponding to the arrow VIII of FIG. 1 with the ventilator cowl partially broken open.

DESCRIPTION OF THE PREFERRED EMBODIMENT

Figure 1:
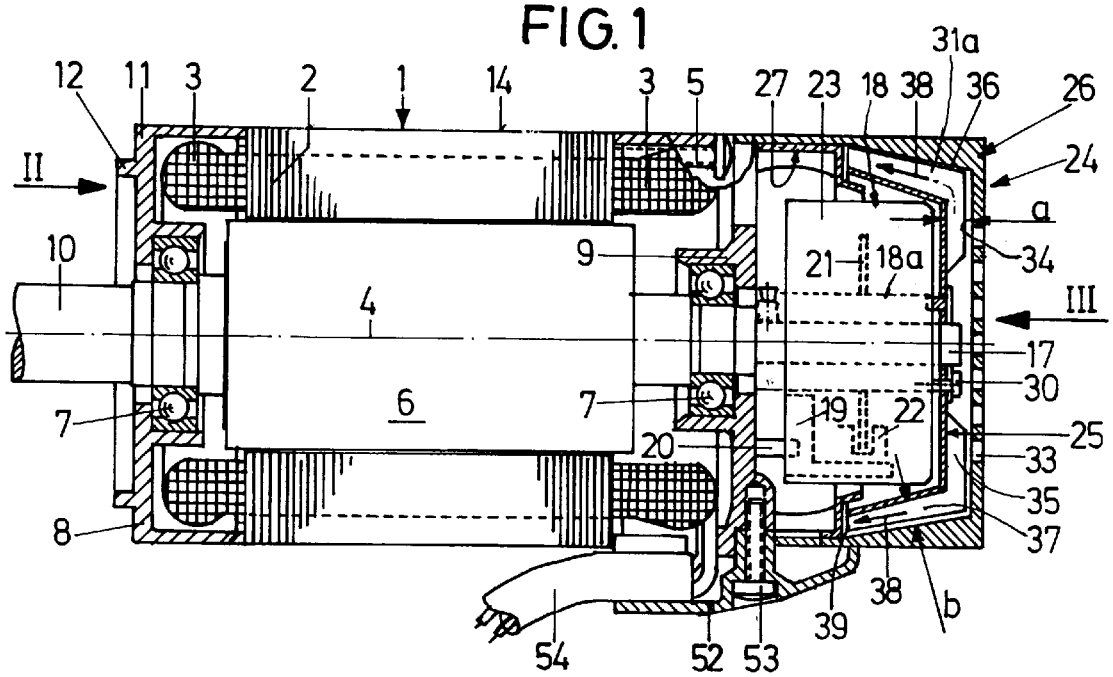
FIG. 1 is a longitudinal section through an electric motor according to the invention.

The motor seen in the drawing comprises a stator 1, of which a laminated core 2 and the end windings 3 of coils are visible. The laminated core 2 is held together with windings 3 and end shield 9 by tie rod screws 5 which are parallel to the central longitudinal axis of the motor. In the stator 1, a shaft 6 is disposed concentrically of the axis 4 and is rotatably run in end shields 8, 9 by means of rolling bearings 7. These end shields 8, 9 cover the end windings 3 and are joined to the stator 1 by means of tie rod screws 5.

Figure 2:
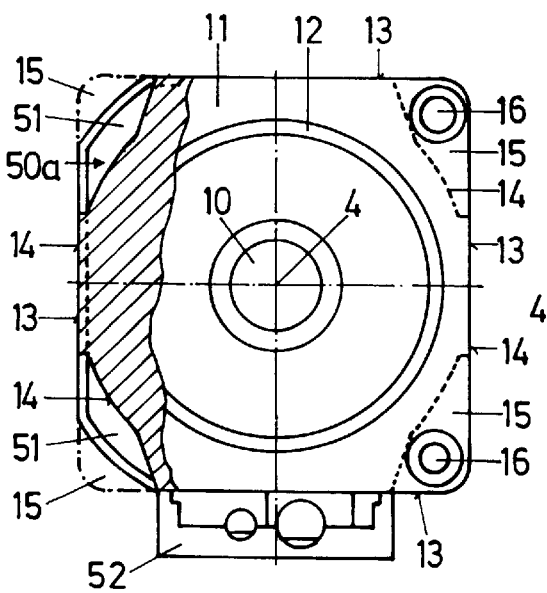
FIG. 2 is an illustration, partially broken open, of a front view of the end shield on the drive side corresponding to the arrow II of FIG. 1.

Concentrically of the axis 4, a drive-shaft journal 10 joined to the shaft 6 is extended out of the end shield 8 on the drive side. The end shield 8 is provided with an approximately square flange 11. Concentrically of the axis 4, a ring land 12 is formed on the flange 11, projecting from the latter. As seen in FIG. 2, the lateral edges 13 of the flange 11 are each approximately tangential to the outline 14 of the stator 1 illustrated by dashed lines in FIG. 2. Only the corner portions 15 of the lateral edges 13 of the flange 11 project over the outline 14 of the stator 1. In each of these corner portions 15, a drilled hole 16 is formed in the flange 11, lying outside the outline 14. Screws can be passed through these holes 16, by means of which the motor can be fixed to a mounting, for example of a sewing machine.

The end shield 9 opposite to the end shield 8 on the drive side is an end shield disposed on the ventilator side. In this area, a shaft journal 17 of the shaft 6 projects from the end shield 9, driving an actual value transmitter 18. This actual value transmitter 18 is of conventional design, i.e. it has a supporting unit 19 which is joined to the end shield 9 non-rotatably, i.e. against rotation, by means of an elastic element 20. The actual value transmitter 18 comprises a disk 21 having one or several transparent windows or slits; the disk 21 rotates together with the shaft 6 and runs through sensors 22. The supporting unit 19 comprising the sensors 22 and the disk 21 are covered by a transmitter casing 23 which is non-rotatably connected with the end shield 9. Upon rotation of the shaft 6, signals are generated by the cooperation of the disk 21 and the sensors 22, these signals representing the angular position of the shaft 6 on the one hand and its speed on the other. This principle of an actual value transmitter 18 of this type is generally known.

The actual value transmitter 18 is surrounded by a ventilator 24. This ventilator substantially comprises a ventilator wheel 25, a ventilator cowl 26 and an air conduction screen 27. As shown in FIGS. 4 and 5, the ventilator wheel 25 is cup-shaped, i.e. it has a disk section 28 that is radial to the axis 4 and a truncated cone section 29 adjoining the outer edge of the disk section 28. As shown in FIG. 1, the disk section 28 is screwed by screws 30 on a hub 18a, rotating together with the shaft 6, of the actual value transmitter 18, i.e. the disk section 28 rotates together with the latter. The radial outer portion of the disk section 28 is provided with blades 31 which are radial to the axis 4 and which are continued by the blades 31a on the truncated cone section 29. Within the blades 31, i.e. in the central portion of the disk section 28, provision is made for a intake portion 32 of the ventilator 24, a suction opening 33 on the ventilator cowl 26 being allocated to this intake portion 32. The ventilator cowl 26 surrounds the blades 31, 31a by some play so that radial channels 35 are formed between the disk section 28, the blades 31 and the front wall 34 of the ventilator cowl 26, the height a of these channels being constant in the direction of the axis 4. Radial/axial channels 37 are defined by the truncated cone section 29, the blades 3 la disposed on the latter and the outer wall 36 of the ventilator cowl 26 which surround the blades 3 la, their extension being more axial, i.e. in the direction of the axis 4, than radial to the latter. The height b of these channels 37 decreases in the direction of flow 38, i.e. in the direction toward the stator 1, so that on the whole, the cross-section of these channels 37 narrows toward their outlet 39. Since the blades 31 and 31a are at least partially radial to the axis 4, the ventilator 24 is independent of the direction of rotation. The air conduction screen 27 is disposed between the ventilator wheel 25 and end shield 9 on the ventilator side.

The air conduction screen 27 has an inner ring land 40 fitting under the truncated cone section 29 of the ventilator wheel 25 in the vicinity of the outlets 39. A wall section 41 extends from this ring land 40, slightly radially expanding toward the stator 1. Four elevations 42, 43, wedged in a plan view, are formed on this wall section 41, their slightly rounded, obtuse end 44 and 45, respectively, being turned toward the ventilator wheel 25. Identical, wedged elevations 42 and 43, respectively, are diametrically opposite to each other, the wedged elevations 42, which are disposed at the top and at the bottom, being wider, i.e. having a greater aperture angle c than the wedged elevations 43 disposed on the sides, their aperture angle d being less than c. The wedged elevations 42 and 43 have channel side walls 46 and 47, respectively, which, by the respective aperture angle c and d, extend from their ends 44 and 45 toward the stator 1. The outer wall 36 of the ventilator cowl 26 rests tightly on the elevations 42, 43. A guide channel 48 and 48a, respectively, is formed between the wall section 41, a channel side wall 46 and the outer wall 36 of the ventilator cowl 26, the neighboring guide channels 48 and 48a being formed and disposed in mirror symmetry to each other.

Figure 3:
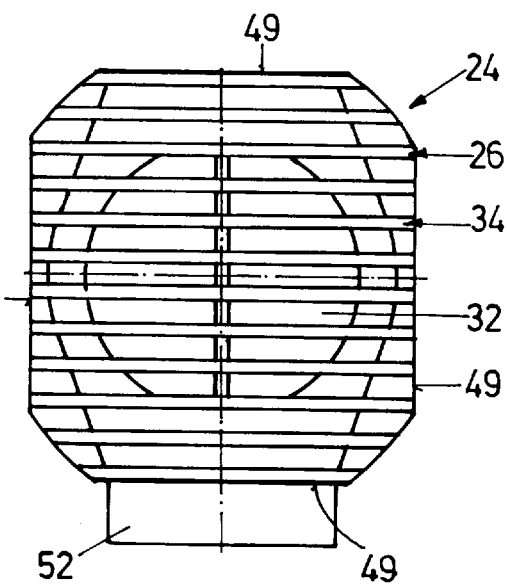
FIG. 3 is a front view of the ventilator corresponding to the arrow III of FIG. 1.

As seen in FIGS. 2 and 3, the ventilator cowl 26 has a cross-section which does project over the lateral edges 13 of the flange 11. The straight lateral edges 49 of the ventilator cowl 26 coincide with the lateral edges 13 of the flange, i.e. the outline 14 of the stator 1 does not project over them either. In the portion of the ventilator cowl 26 which is in alignment with the corner portions 15 of the flange 11, the guide channels 48, 48a pass into outlet channels 50, 50a of constant cross-section, which are parallel to the axis 4 and formed between the outer wall 36 of the ventilator cowl 26 and the end shield 9 on the ventilator side. These outlet channels 50 have outlets 51 open toward the stator 1.

During operation of the motor, i.e. upon rotation of the shaft 6 and thus of the ventilator wheel 25, air is sucked in through the suction opening 33 in the ventilator cowl 26 corresponding to the direction of flow 38 and, while being correspondingly accelerated, flows from the intake portion 32 of the ventilator wheel 25 radially to the axis 4 through the radial channels 35 and from there through the radial/axial channel 37, further acceleration of the air in the direction of flow 38 taking place due to the described narrowing of these channels in the direction of flow 38. In the guide channels 48, 48a which narrow in the direction of flow 38, further acceleration of the air takes place, the air being deflected in the outlet channels 50, 50a into a direction of flow 38 that is parallel to the axis 4. The air flows out of the outlets 51 and along the stator 1, cooling the latter. As seen in the drawing, the ventilator 24 hardly increases the overall length of the motor, this length reaching anyway as far as to the actual value transmitter 18. The ventilator 24 does not project over the maximal cross-sectional shape of the motor given by the flange 11.

For completion, mention is made of the fact that a cable cover 52 can be fixed to the end shield 9 on the ventilator side by means of a screw 53, a supply line 54 for the motor and a line (not shown) of the actual value transmitter 18 being covered and arrested by this cover 52. Of course, the stator 1 can also be surrounded by a housing.

The ventilator cowl 26 is mounted on the end shield 9 on the ventilator side in such a way that it contributes substantially to heat elimination. To this end, two fastening ribs 55 are formed on the end shield 9, which stand out and are provided with a threaded hole 56 extending radially to the axis 4. The outer wall 36 of the ventilator cowl 26 is provided with an associated hole 57. The air conduction screen 27 is provided with an associated hole 58 in the vicinity of the wedged elevations 43. A countersunk head screw 59 is screwed through the holes 57, 58 into the associated threaded hole 56. Since the holes 58 are slightly misaligned relative to the threaded hole 56 in the direction toward the suction opening 33, for instance by 0.1 mm, the ventilator cowl 26 is forced in the direction toward the stator 1 when the screws 59 are tightened, this producing an especially tight and wide connection with the end shield 9. This helps obtain good heat transmission from the stator 1 via the end shield 9 on the ventilator side and toward the ventilator cowl 26 so that, already in the ventilator 24 itself, the cooling air flowing through the ventilator 24 in the direction of flow 38 takes part of the heat dissipated by the stator 1.

For good heat flow to take place, not only the end shields 8, 9, but also the ventilator 24 substantially consist of a metal of good thermal conductivity.

What is claimed is:

1. An electric motor, comprising
    a stator (1) having a central longitudinal axis (4) and an outline (14), a shaft (6) disposed concentrically of the axis (4) in the stator (1), a first end shield (8) on a drive side and a second end shield (9) on a ventilator side, in both of which the shaft (6) is run, a flange (11), which is provided on the first end shield (8) and which has corner portions (15) projecting over the outline (14) of the stator (1), and
    a ventilator (24 for cooling the stator (1) with an air flow, which is adjacent to the second end shield (9), and which comprises a ventilator wheel (25) coupled for rotation with the shaft (6) and a ventilator cowl (26) covering the ventilator (24) outwardly,
    wherein the ventilator (24) comprises air outlets (51) directed towards the stator (1) and in alignment with the corner portions (15) of the flange (11) for directing the air flow into a direction of the corner portions (15), wherein the ventilator wheel 25 is cup-shaped, having a disk section (28) radial to the axis (4) and a truncated cone section (29) expanding towards the stator (1), blades (31, 31a) being provided on said sections (28, 29), wherein radial channels (35) are formed between the disk section (28), the radial blades (31) and a front wall (34) of the ventilator cowl (26), and radial/axial channels (37) adjoining the radial channels (35) are formed between the truncated cone section (29, the blades (31a) mounted thereon and an outer wall (36) of the ventilator cowl (26),
    wherein the radial/axial channels (37) have a height (b) which decreases in the direction towards the stator (1), and
    wherein between the ventilator wheel (25) and the air outlets (51), an air conduction screen (27) is disposed, which is non-rotatable relative to the stator (1) and which defines guide channels (48, 48a) narrowing in the direction towards the air outlets (51).

2. An electric motor according to claim 1, wherein the radial channels (35) have a height (a) constant in the direction of the axis (4).

3. An electric motor according to claim 1, wherein the radial/axial channels (37) have a cross-section which decreases in the direction toward the stator (1).

4. An electric motor according to claim 1, wherein externally, the guide channels (48, 48*a*) are defined by the outer wall (36) of the ventilator cowl (26).

5. An electric motor according to claim 1, wherein the guide channels (48, 48*a*) are formed between a wall section (41) expanding toward the stator (1) and wedged elevations (42, 43) of the air conduction screen (27).

6. An electric motor according to claim 1, wherein outlet channels (50, 50*a*) parallel to the axis (4) are formed between the guide channels (48, 48*a*) and the air outlets (51).

7. An electric motor according to claim 1, wherein an actual value transmitter (18) is provided in vicinity to the second end shield (9), the ventilator (24) surrounding it in cup-like manner.

8. An electric motor according to claim 1, wherein the ventilator (24) is widely connected with the second end shield (9).

* * * * *